(12) United States Patent
Mashio et al.

(10) Patent No.: US 10,866,163 B2
(45) Date of Patent: Dec. 15, 2020

(54) ANOMALY MONITORING DEVICE AND METHOD FOR PRODUCING ANOMALY SIGNS ACCORDING TO COMBINATIONS OF SENSORS BASED ON RELATIONSHIP OF SENSOR FLUCTUATIONS

(71) Applicant: MITSUBISHI HEAVY INDUSTRIES, LTD., Tokyo (JP)

(72) Inventors: Kenji Mashio, Tokyo (JP); Takashi Azuma, Tokyo (JP); Susumu Shiizuka, Tokyo (JP); Takae Yamashita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 222 days.

(21) Appl. No.: 16/067,710

(22) PCT Filed: Mar. 24, 2017

(86) PCT No.: PCT/JP2017/012006
§ 371 (c)(1),
(2) Date: Jul. 2, 2018

(87) PCT Pub. No.: WO2017/164368
PCT Pub. Date: Sep. 28, 2017

(65) Prior Publication Data
US 2019/0003927 A1    Jan. 3, 2019

(30) Foreign Application Priority Data

Mar. 24, 2016 (JP) ................................. 2016-060713

(51) Int. Cl.
*G01M 99/00* (2011.01)
*G05B 23/02* (2006.01)
(Continued)

(52) U.S. Cl.
CPC ......... *G01M 99/005* (2013.01); *G05B 23/024* (2013.01); *G05B 23/0221* (2013.01);
(Continued)

(58) Field of Classification Search
USPC ......................................................... 702/183
See application file for complete search history.

(56) References Cited

U.S. PATENT DOCUMENTS 5,548,597 A      8/1996  Kayama et al.
2006/0287806 A1 12/2006  Hori
(Continued)

FOREIGN PATENT DOCUMENTS

EP    1 734 342 A1   12/2006
EP    2 975 525 A1    1/2016
(Continued)

OTHER PUBLICATIONS

International Search Report dated Jun. 13, 2017, issued in counterpart application No. PCT/JP2017/012006, with English translation. ( 4 pages).
(Continued)

*Primary Examiner* — Paul D Lee
(74) *Attorney, Agent, or Firm* — Westerman, Hattori, Daniels & Adrian, LLP

(57) ABSTRACT

Among a plurality of sensors that detect a state of a control subject, a relationship fluctuation level between a magnitude of a signal output by a subject sensor and a magnitude of a signal output by another related sensor is calculated for each subject sensor and related sensor combination. Moreover, the subject sensor and related sensor combinations for which a value of the relationship fluctuation level is a predetermined value or more are identified, and a respective number of appearances of the subject sensor and the related sensor included in the identified combinations thereof is calculated.

6 Claims, 5 Drawing Sheets

(51) Int. Cl.
*G06F 11/07* (2006.01)
*G01M 13/04* (2019.01)

(52) U.S. Cl.
CPC ... *G01M 13/04* (2013.01); *G05B 2219/31477* (2013.01); *G06F 11/0751* (2013.01)

(56) References Cited

U.S. PATENT DOCUMENTS

| | | | |
|---|---|---|---|
| 2012/0048027 A1* | 3/2012 | Hashiguchi | B25J 13/085 |
| | | | 73/763 |
| 2014/0195868 A1 | 7/2014 | Hasegawa | |
| 2015/0226645 A1* | 8/2015 | Seo | G05B 23/024 |
| | | | 702/182 |
| 2016/0231738 A1 | 8/2016 | Kato | |
| 2017/0351563 A1 | 12/2017 | Miki et al. | |
| 2018/0158556 A1 | 6/2018 | Azuma et al. | |

FOREIGN PATENT DOCUMENTS

| | | |
|---|---|---|
| JP | H06-187030 A | 7/1994 |
| JP | 2000-276220 A | 10/2000 |
| JP | 2006-350707 A | 12/2006 |
| JP | 2015-170121 A | 9/2015 |
| JP | 2017-62730 A | 3/2017 |
| WO | 2013/027562 A1 | 2/2013 |
| WO | 2015/045319 A1 | 4/2015 |
| WO | 2016/103650 A1 | 6/2016 |

OTHER PUBLICATIONS

Written Opinion dated Jun. 13, 2017, issued in counterpart application No. PCT/JP2017/012006, with English translation. (10 pages).
"Kosho Yocho kansi System no Kaihatsu ni Tsuite", [Online], Hozen no Choryu, Japan Society of Maintenology, Aug. 1, 2014 (Aug. 1, 2014), [retrieval date Jun. 1, 2017 (Jun. 1, 2017)], Internet. (2 pages).

* cited by examiner

FIG. 3

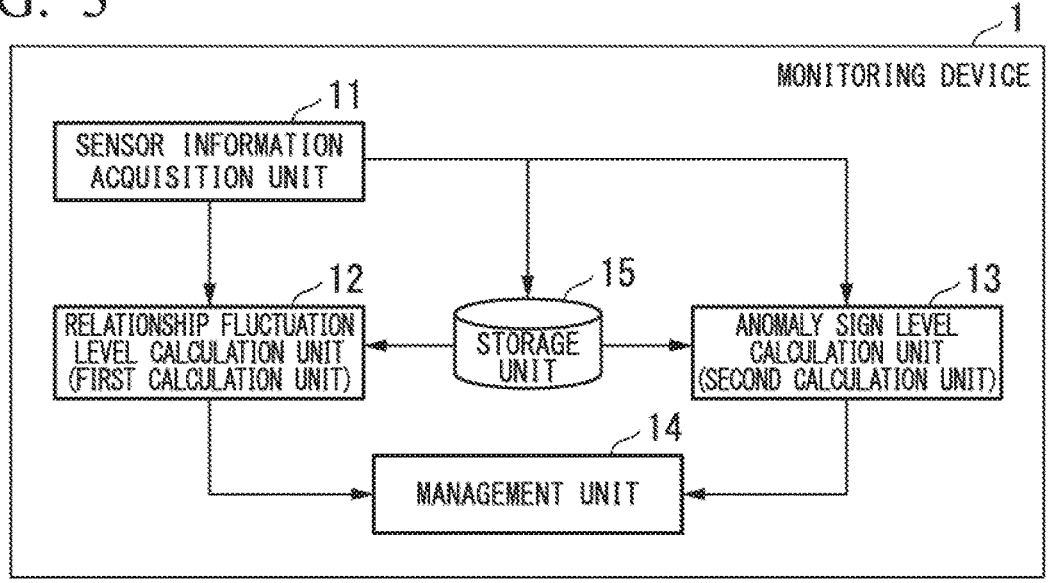

FIG. 4

| SUBJECT SENSOR | RELATED SENSOR |
|---|---|
| ○○ LINE OUTLET FLOW RATE SENSOR | ×× PUMP BEARING TEMPERATURE SENSOR |
| ○○ LINE OUTLET FLOW RATE SENSOR | ○○ LINE INLET TEMPERATURE SENSOR |
| ○○ LINE OUTLET FLOW RATE SENSOR | □□ LINE OUTLET TEMPERATURE SENSOR |

FIG. 5

| SUBJECT SENSOR | RELATED SENSOR | RELATIONSHIP FLUCTUATION LEVEL |
|---|---|---|
| ○○ LINE OUTLET FLOW RATE SENSOR | ×× PUMP BEARING TEMPERATURE SENSOR | ...... |
| ○○ LINE OUTLET FLOW RATE SENSOR | ○○ LINE INLET TEMPERATURE SENSOR | ...... |
| ○○ LINE OUTLET FLOW RATE SENSOR | □□ LINE OUTLET TEMPERATURE SENSOR | ...... |
| ○○ LINE INLET TEMPERATURE SENSOR | ×× PUMP BEARING TEMPERATURE SENSOR | ...... |
| ×× PUMP BEARING TEMPERATURE SENSOR | ○○ LINE INLET TEMPERATURE SENSOR | ...... |
| □□ LINE OUTLET TEMPERATURE SENSOR | ○○ LINE OUTLET FLOW RATE SENSOR | ...... |

ANOMALY MONITORING DEVICE AND METHOD FOR PRODUCING ANOMALY SIGNS ACCORDING TO COMBINATIONS OF SENSORS BASED ON RELATIONSHIP OF SENSOR FLUCTUATIONS

TECHNICAL FIELD

The present invention relates to a monitoring device, a monitoring method, and a program.

Priority is claimed on Japanese Patent Application No. 2016-060713, filed Mar. 24, 2016, the content of which is incorporated herein by reference.

BACKGROUND ART

Patent Document 1 discloses an anomaly diagnosis method for acquiring sensing information from a sensor provided in a control subject, and performing an anomaly diagnosis of the control subject using the sensing information thereof. In the anomaly diagnosis method, a normal model representing a normal state of the control subject and an anomalous model representing an anomalous state of the control subject are prepared in advance. Then, an anomaly diagnosis of the control subject is performed by comparing a measured value of the output of the control subject, an estimated value of the output of the normal model, and an estimated value of the output of the anomalous model.

PRIOR ART DOCUMENTS

Patent Document

Japanese Unexamined Patent Application, First Publication No. H 6-187030

SUMMARY

Problems to be Solved by the Invention

Incidentally there is a case where a plurality of sensors is provided in a control subject. For example, in plants and the like, there are various sensing subjects such as piping, pumps, driving devices, and heat generating devices, and various sensors are provided in the respective sensing subjects thereof. A monitoring person of a control subject provided with such a plurality of sensors constantly monitors the plurality of sensors provided in the control subject, and monitors whether or not a sign of an anomaly has occurred. The monitoring person is required to more appropriately judge the occurrence of the sign of an anomaly thereof. Further, a more suitable monitoring device for judging the occurrence of a sign of an anomaly is required.

Therefore, an object of the present invention is to provide a monitoring device, a monitoring method, and a program capable of solving the problems described above.

Means for Solving the Problem

According to a first aspect of the present invention, a monitoring device includes: a first calculation unit that calculates, among a plurality of sensors that detect a state of a control subject, a relationship fluctuation level between a magnitude of a signal output by a subject sensor and a magnitude of a signal output by another related sensor, for each subject sensor and related sensor combination; and a management unit that identifies the subject sensor and related sensor combinations for which a value of the relationship fluctuation level is a predetermined value or more, and calculates a respective number of appearances of the subject sensor and the related sensor included in the identified combinations thereof.

In the monitoring device described above, the management unit generates and outputs first anomaly sign information expressing, at each point in time, the number of appearances of each sensor represented by the subject sensor and the related sensor included in the identified combinations.

Furthermore, the monitoring device described above includes: a second calculation unit that calculates an anomaly sign level obtained by summing the relationship fluctuation levels for all of the subject sensor and related sensor combinations, and the management unit generates and outputs second anomaly sign information representing a moving average line of the anomaly sign level.

In the monitoring device described above, the management unit generates and outputs the second anomaly sign information in which the moving average line of the anomaly sign level is superimposed on a graph showing the anomaly sign level corresponding to a time course.

Moreover, in the monitoring device described above, the control subject is a plant, and the plurality of sensors represent sensors provided in the plant.

Furthermore, according to a second aspect of the present invention, a monitoring method includes: calculating, among a plurality of sensors that detect a state of a control subject, a relationship fluctuation level between a magnitude of a signal output by a subject sensor and a magnitude of a signal output by another related sensor, for each subject sensor and related sensor combination; and identifying the subject sensor and related sensor combinations for which a value of the relationship fluctuation level is a predetermined value or more, and calculating a respective number of appearances of the subject sensor and the related sensor included in the identified combinations thereof.

Moreover, according to a third aspect of the present invention, a program that causes a computer of a monitoring device to function as: a first calculation means that calculates, among a plurality of sensors that detect a state of a control subject, a relationship fluctuation level between a magnitude of a signal output by a subject sensor and a magnitude of a signal output by another related sensor, for each subject sensor and related sensor combination; and a management means that identifies the subject sensor and related sensor combinations for which a value of the relationship fluctuation level is a predetermined value or more, and calculates a respective number of appearances of the subject sensor and the related sensor included in the identified combinations thereof.

Effects of the Invention

According to the present invention, a monitoring person can more appropriately judge the occurrence of a sign of an anomaly of a monitoring subject.

BRIEF DESCRIPTION OF DRAWINGS

FIG. 3 is a functional block diagram of a monitoring device according to an embodiment of the present invention.

FIG. 4 is a first data table showing sensor combinations according to an embodiment of the present invention.

FIG. 5 is a diagram showing a data table that stores a relationship fluctuation level for subject sensors and related sensors according to an embodiment of the present invention.

EMBODIMENTS FOR CARRYING OUT THE INVENTION

Hereunder, a monitoring device according to an embodiment of the present invention will be described with reference to the drawings.

Figure 1:
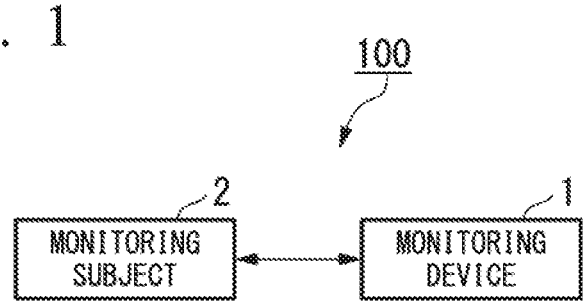
FIG. 1 is a diagram showing a configuration of a monitoring system including a monitoring device according to an embodiment of the present invention.

FIG. 1 is a diagram showing a configuration of a monitoring system 100 that includes a monitoring device according to the same embodiment. The monitoring device 1 according to the present embodiment is connected to a plurality of sensors provided in a monitoring subject (control subject) 2 by a communication cable or the like. The monitoring device 1 receives the signals output from the sensors and monitors for the occurrence of an anomaly or a sign of an anomaly in the monitoring subject.

Figure 2:
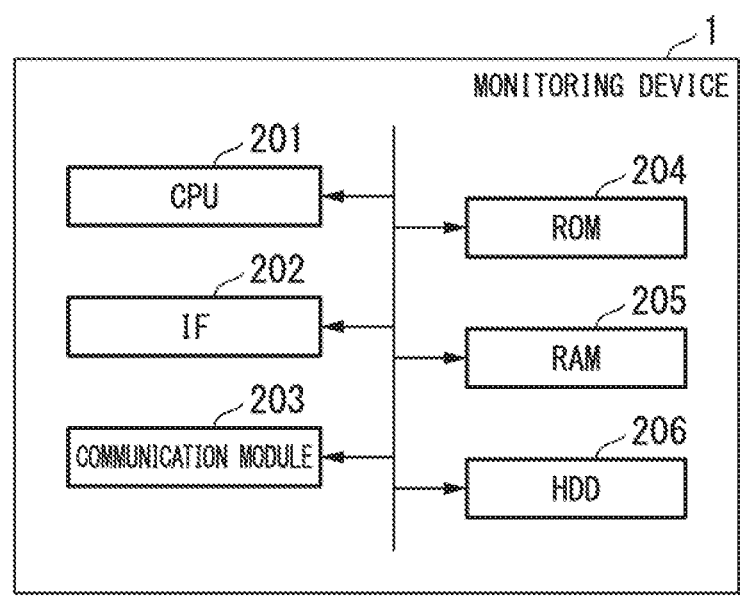
FIG. 2 is a diagram showing a hardware configuration of a monitoring device according to an embodiment of the present invention.

FIG. 2 is a diagram showing a hardware configuration of the monitoring device.

As shown in FIG. 2, the monitoring device 1 is a computer that includes a configuration such as a CPU (Central Processing Unit) 201, an IF (Interface) 202, a communication module 203, a ROM (Read Only Memory) 204, a RAM (Random Access Memory) 205, and a HDD (Hard Disk Drive) 206. The IF 202, for example, inputs a signal from a keyboard, a mouse, or the like. The communication module 203 is connected to a plurality of sensors provided in the monitoring subject 2 by a communication cable or the like.

FIG. 3 is a functional block diagram of the monitoring device.

The monitoring device 1 stores an anomaly sign diagnosis program. The CPU 201 of the monitoring device 1 executes the anomaly sign diagnosis program based on an operation of a monitoring person. As a result, the monitoring device 1 has the functions of a sensor information acquisition unit 11, a relationship fluctuation level calculation unit 12, an anomaly sign level calculation unit 13, and a management unit 14. Furthermore, the monitoring device 1 includes a storage unit 15. The storage unit 15 may be realized by a hardware configuration such as the ROM 204, the RAM 205, or the HDD 206.

The sensor information acquisition unit 11 acquires sensing information from the sensors attached to the monitoring subject 2.

The relationship fluctuation level calculation unit 12 calculates, among the plurality of sensors that detect the state of the monitoring subject 2, a relationship fluctuation level between the magnitude of a signal output by a subject sensor and the magnitude of a signal output by another related sensor, for each subject sensor and related sensor combination.

The anomaly sign level calculation unit 13 calculates an anomaly sign level obtained by summing the relationship fluctuation levels for each of the subject sensor and related sensor combinations, for all combinations thereof.

The management unit 14 specifies subject sensor and related sensor combinations whose relationship fluctuation level has a value of at least a predetermined value. The management unit 14 calculates the respective number of appearances of the subject sensor and related sensor included in the identified combinations. The management unit 14 generates and outputs first anomaly sign information expressing, at each point in time, the number of appearances of each of the sensors represented by the subject sensor and the related sensor included in the identified combinations. In the following description, the relationship fluctuation level calculation unit 12 will be referred to as a first calculation unit 12. Furthermore, in the following description, the anomaly sign level calculation unit 13 will be referred to as a second calculation unit 13.

FIG. 4 shows a first data table representing sensor combinations.

A plurality of sensors is attached to the monitoring subject 2. The sensors attached to monitoring subject 2 are divided into a subject sensor and related sensors whose output varies according to the output of the subject sensor thereof. A single sensor may be classified as both a subject sensor and a related sensor. The first data table shown in FIG. 4 is a list containing, among the plurality of sensors provided in the monitoring subject 2, combinations of two sensors for a certain subject sensor and related sensors. For example, in the monitoring subject 2, it is assumed that a ○○ line outlet flow rate sensor, a ○○ line inlet temperature sensor, a xx pump bearing temperature sensor, a □□ line outlet temperature sensor, and the like, are provided.

If the value of the xx pump bearing temperature sensor fluctuates when the value of the ○○ line outlet flow rate sensor changes, the ○○ line outlet flow rate sensor is classified as the subject sensor, and the xx pump bearing temperature sensor is classified as the related sensor. In the first data table of FIG. 4, the combination of the two sensors thereof is recorded in the first data table. Similarly, in the example of the first data table, the ○○ line outlet flow rate sensor and the ○○ line inlet temperature sensor are recorded as a subject sensor and related sensor combination. In the same manner, in the example of the first data table, the ○○ line outlet flow rate sensor and the □□ line outlet temperature sensor are recorded as a subject sensor and related sensor combination. The first data table is recorded in the storage unit 15 for example.

In this manner, the first data table records a correspondence between a subject sensor and related sensors which perform sensing of another subject such that, when the output value of the subject sensor thereof fluctuates, the value of the other subject fluctuates from an influence of the state of the one subject being detected by the sensors thereof. If 100 sensors are attached to the monitoring subject 2 and the sensors are attached to a subject that is mutually influenced by all of the respective combinations thereof, the 100 factorial combinations of subject sensor and related sensor combinations may be recorded in the first data table. That is to say, a large number of subject sensor and related sensor combinations may be recorded in the first data table.

The monitoring device 1 calculates the fluctuation level (relationship fluctuation level) of the relationship between the magnitude of the signal output by the subject sensor and the magnitude of the signal output by the related sensor for each subject sensor and related sensor combination. The monitoring device 1 identifies the subject sensor and related sensor combinations whose relationship fluctuation level has a value of at least a predetermined value. The monitoring device 1 calculates the respective number of appearances of the subject sensor and the related sensor included in the specified combinations thereof. The monitoring device 1 generates and outputs first anomaly sign information expressing, at each point in time, the number of appearances of each of the sensors represented by the subject sensor and the related sensor included in the identified combinations. Furthermore, the monitoring device 1 calculates an anomaly sign level obtained by summing the relationship fluctuation levels for each of the subject sensor and related sensor combinations, for all combinations thereof. The monitoring device 1 generates and outputs second anomaly sign information representing a moving average line of the anomaly sign level.

FIG. 5 is a diagram showing a data table that stores the relationship fluctuation level for the subject sensors and the related sensors.

The monitoring device 1 receives sensing information for the sensors provided in the monitoring subject 2 from the respective sensors. The first calculation unit 12 calculates, based on the sensing information of the subject sensors and the related sensors shown in FIG. 4, fluctuation levels for the relationship between the values thereof. For example, assume that the relationship between a sensor A, which is a subject sensor, and a sensor B, which is a related sensor of the sensor A, is recorded in the first data table of FIG. 4. Then, for example, assume that it has been obtained by way of a simulation or an actual measurement beforehand that, if the signal of sensor A fluctuates by 0.01%, the signal of sensor B fluctuates by 0.02%. If the fluctuation of the signal of the sensor A and the fluctuation of the signal of the sensor B are different from normal, there is a possibility that a sign of an anomaly has occurred. The monitoring device 1 calculates relationship fluctuation levels indicating the fluctuation level of the relationship between the values of such subject sensors and related sensors. The relationship fluctuation level is represented by a numerical value. The monitoring device 1 generates a relationship fluctuation level table (FIG. 5) showing the correspondence between the subject sensor, the related sensor, and the relationship fluctuation level. As the value of the relationship fluctuation level increases, it can be judged that the fluctuation of the signal of the sensor A and the fluctuation of the relationship of the signal of the sensor B are becoming more abnormal. As a technique that calculates the relationship fluctuation level, for example, there is a system invariant analysis technique and the like. The monitoring device 1 calculates the relationship fluctuation level using such a known technique. The calculation of the relationship fluctuation level may be performed by any method.

Figure 6:
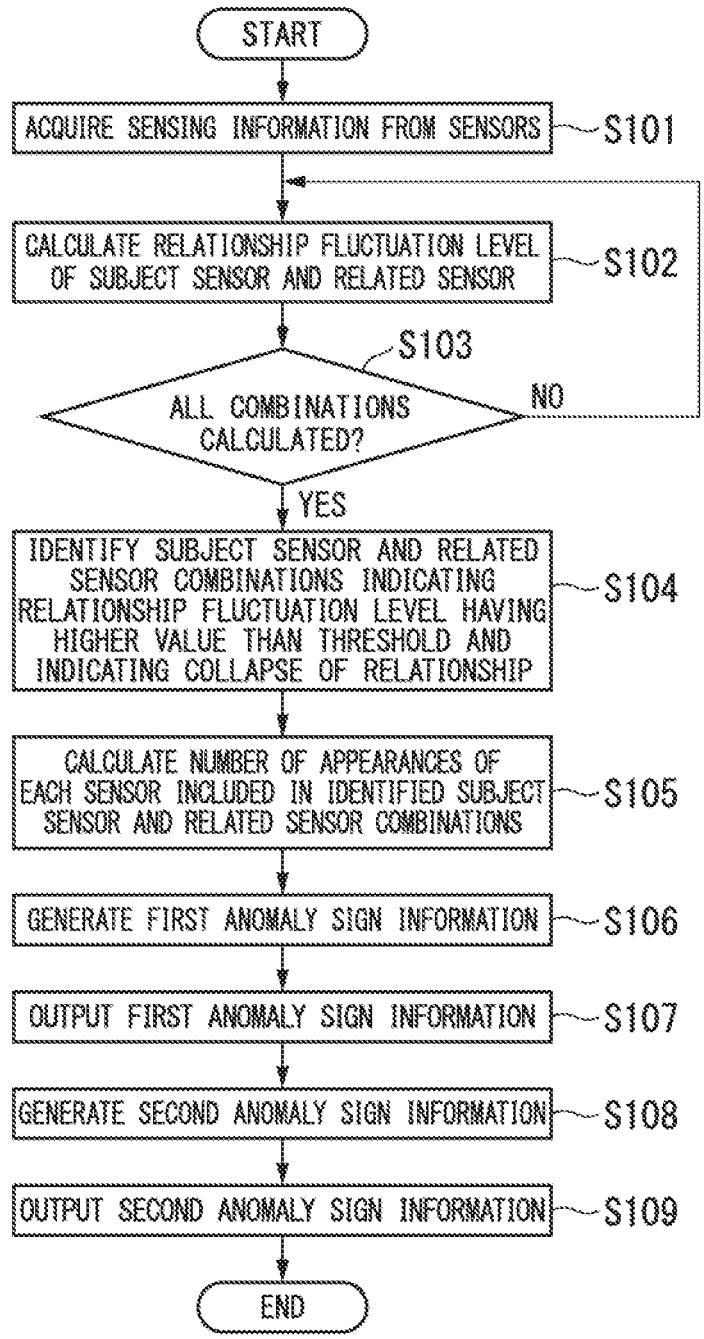
FIG. 6 is a diagram showing a processing flow of a monitoring device according to an embodiment of the present invention.

FIG. 6 is a diagram showing a processing flow of a monitoring device.

The processing flow of the monitoring device 1 will be described. In the following description, it is assumed that the monitoring subject 2 is a plant.

The sensor information acquisition unit 11 of the monitoring device 1 acquires sensing information from the plurality of sensors installed in the plant (step S101). The sensor information acquisition unit 11 records the sensing information of the sensors in the storage unit 15. The sensor information acquisition unit 11 instructs the first calculation unit 12 to calculate the relationship fluctuation levels. The first calculation unit 12 reads the first data table shown in FIG. 4 from the storage unit 15. The first calculation unit 12 obtains the sensing information of the subject sensors and the related sensors recorded in the first data table. The first calculation unit 12 uses the sensing information thereof to calculate the relationship fluctuation levels between the subject sensors and the related sensors (step S102). The first calculation unit 12 associates the subject sensor and related sensor combinations by recording the relationship fluctuation levels of the sensor combinations thereof in a relationship fluctuation level table of the manner shown in FIG. 5. The first calculation unit 12 determines whether or not relationship fluctuation levels have been calculated for all subject sensor and related sensor combinations recorded in FIG. 4 (step S103). The first calculation unit 12 ends the processing when relationship fluctuation level have been calculated for all combinations. The first calculation unit 12 notifies the management unit 14 of the completion of the processing. If the first calculation unit 12 has not calculated relationship fluctuations for all combinations, the processing that calculates the relationship fluctuation of the following subject sensor and related sensor combination is repeated.

As a result of the processing described above, first calculation unit 12 calculates relationship fluctuation levels for all subject sensor and related sensor combinations recorded in the first data table. The management unit 14 identifies, among the relationship fluctuation levels calculated for the subject sensor and related sensor combinations, the subject sensor and related sensor combinations whose relationship fluctuation level has a value higher than the threshold indicating a collapse of the relationship (step S104). The management unit 14 calculates the number of appearances of each of the sensors included in the identified subject sensor and related sensor combinations thereof (step S105). More specifically, in step S104, it is assumed for example that the relationship fluctuation levels of the subject sensor and related sensor combinations shown in FIG. 5 have identified the combinations judged as having a value of at least the threshold indicating the collapse of the relationship.

FIG. 5 shows a first combination of the ○○ line outlet flow rate sensor and the xx pump bearing temperature sensor as a subject sensor and related sensor combination. FIG. 5 shows a second combination of the ○○ line outlet flow rate sensor and the ○○ line inlet temperature sensor as a subject sensor and related sensor combination. FIG. 5 shows a third combination of the ○○ line outlet flow rate sensor and the on line outlet temperature sensor as a subject sensor and related sensor combination. FIG. 5 shows a fourth combination of the ○○ line inlet temperature sensor and the xx pump bearing temperature sensor as a subject sensor and related sensor combination. FIG. 5 shows a fifth combination of the xx pump bearing temperature sensor and the ○○ line inlet temperature sensor as a subject sensor and related sensor combination. FIG. 5 shows a sixth combination of the □□ line outlet temperature sensor and the ○○ line outlet flow rate sensor as a subject sensor and related sensor combination.

In this case, the number of appearances of the ○○ line outlet flow rate sensor is four times. The number of appearances of the xx pump bearing temperature sensor is three times. The number of appearances of the □□ line outlet temperature sensor is two times. The number of appearances of the ○○ line inlet temperature sensor is three times. The management unit 14 generates first anomaly sign information expressing, at each point in time, the number of appearances of each of the sensors (step S106). The management unit 14 outputs the first anomaly sign information to a monitor or the like (step S107).

In the case where the relationship fluctuation level of a subject sensor and related sensor combination is judged to be at least a threshold indicating the collapse of the relationship, the threshold is for judging that the relationship between the fluctuation of the signal of the subject sensor and the signal of the related sensor is different from normal. A subject sensor and related sensor combination of at least the threshold has a relationship in which the fluctuation of the signals of the sensors is different from normal, and it can be stated that the relationship has collapsed.

Figure 7:
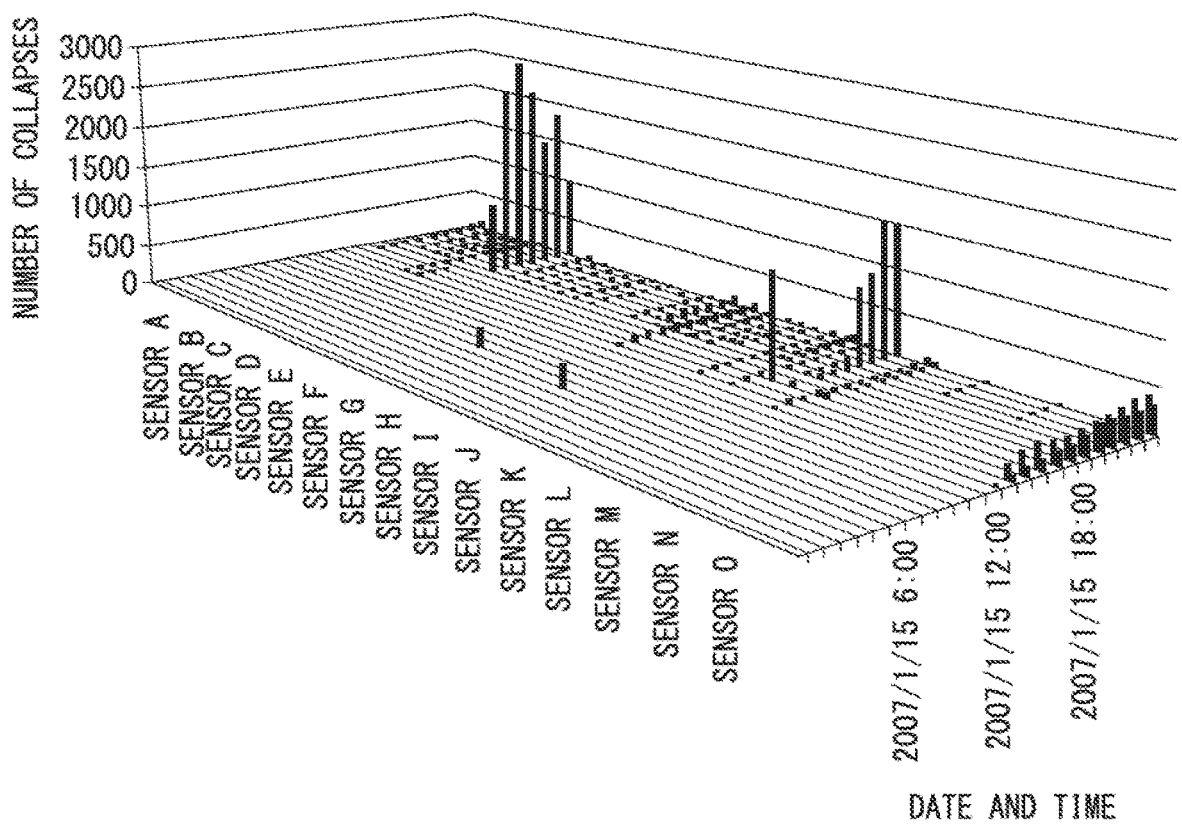
FIG. 7 is a diagram showing an example of first anomaly sign information according to an embodiment of the present invention.

FIG. 7 is a drawing showing an example of first anomaly sign information.

As shown in the drawing, first anomaly sign information displays at each point in time (date and time) the number of appearances of each of the sensors included in the subject sensor and related sensor combinations that have a relationship fluctuation level of at least the threshold indicating a collapse of the relationship.

The monitoring person of the plant can easily and more precisely determine which sensor has a sign of an anomaly by checking such first anomaly sign information.

The management unit 14 repeats the processing of step S101 to step S107 at predetermined time intervals. On the other hand, the second calculation unit 13 acquires from the storage unit 15 the relationship fluctuation levels of all subject sensor and related sensor combinations calculated by the first calculation unit 12. The second calculation unit 13 sums the relationship fluctuation levels of all subject sensor and related sensor combinations to calculate an anomaly sign level. The anomaly sign level increases when the value increases for many relationship fluctuation levels. Therefore, it is possible to estimate a sign of an anomaly by means of the anomaly sign level when the entire plant, which represents the monitoring subject 2, is viewed. The second calculation unit 13 outputs the anomaly sign level to the management unit 14. The second calculation unit 13 outputs the anomaly sign level to the management unit 14 at predetermined time intervals.

The management unit 14 acquires the anomaly sign level at predetermined time intervals and generates second anomaly sign information, which represents a graph thereof. Furthermore, the management unit 14 calculates a moving average line using the anomaly sign levels from past predetermined periods. Then, the management unit 14 generates a moving average line of the movement sign level and second anomaly sign information indicating the anomaly sign level at each predetermined time interval (step S108). The management unit 14 outputs the second anomaly sign information to a monitor (step S109).

Figure 8:
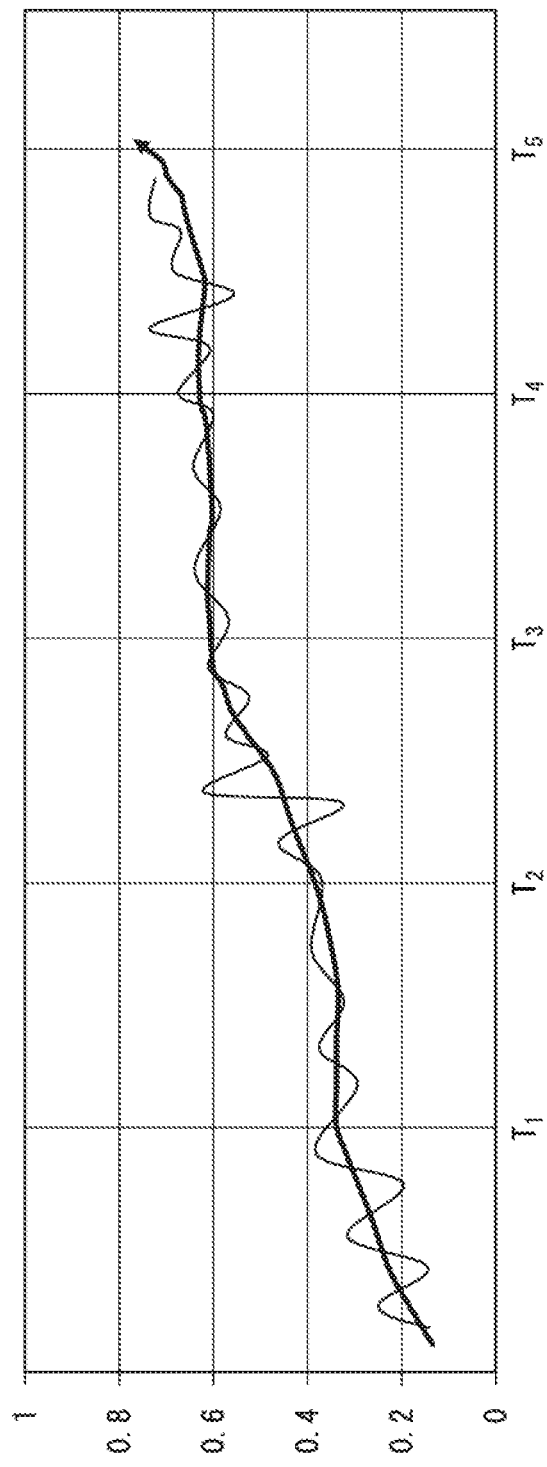
FIG. 8 is a diagram showing an example of second anomaly sign information according to an embodiment of the present invention.

FIG. 8 is a diagram showing an example of second anomaly sign information.

As shown in the drawing, the second anomaly sign information is a graph showing the anomaly sign level at each point in time (date and time) and a moving average line C thereof. In the second anomaly sign information in FIG. 8, the vertical axis indicates the anomaly sign level. Furthermore, the horizontal axis shows the date and time.

The foregoing has described an embodiment of the present invention. According to the processing of the monitoring device 1 described above, the number of appearances of each of the sensors included in the subject sensor and related sensor combinations having a relationship fluctuation level of at least the threshold indicating relationship collapse is displayed at each point in time. Therefore, the monitoring person can more appropriately judge which of the sensors has a sign of an occurrence of an anomaly as judged by the monitoring subject 2.

Furthermore, second anomaly prediction information in which the moving average line of the anomaly sign level is superimposed on a graph showing the anomaly sign level corresponding to a time course is generated and output. Therefore, by outputting the second anomaly sign information, the monitoring person can visually observe the trend of the anomaly sign over a long time period.

The monitoring device 1 described above has a computer system therein. Further, the processing steps described above are stored in a computer-readable recording medium in the form of a program, and the processing described above is performed by the computer reading and executing the program. Here, the computer-readable recording medium refers to a magnetic disk, a magneto-optical disk, a CD-ROM, a DVD-ROM, a semiconductor memory, or the like. Furthermore, the computer program may be delivered to the computer through a communication line, and the computer receiving the program may execute the program.

Moreover, the program described above may be for realizing a part of the functions mentioned above. Further, it may be a so-called difference file (difference program), which can realize the functions mentioned above by a combination with a program already recorded in the computer system.

REFERENCE SYMBOLS

1 Monitoring device
2 Monitoring subject
11 Sensor information acquisition unit
12 Relationship fluctuation level calculation unit (first calculation unit)
13 Anomaly sign level calculation unit (second calculation unit)
14 Management unit
15 Storage unit

The invention claimed is:

1. A monitoring device configured to monitor a control subject according to output signals of a plurality of sensors each configured to detect a state of the control subject,
the plurality of sensors including a combination of a subject sensor and its related sensor, the monitoring device comprising a processor and a memory configured to store instructions, the processor executing the instructions to implement:
a first calculation unit configured to calculate a relationship fluctuation level representing a relationship between a fluctuation of the subject sensor and a fluctuation of the related sensor for each combination of the subject sensor and its related sensor;
a second calculation unit configured to calculate an anomaly sign level by summing up the relationship fluctuation level for all combinations of the subject sensor and its related sensor; and
a management unit configured to identify the combination of the subject sensor and the related sensor with the relationship fluctuation level higher than a threshold indicating a collapse of the relationship and to thereby calculate a number of appearances of the subject sensor and the related sensor included in the identified combination, thus producing first anomaly sign information representing the number of appearances for each sensor.

2. The monitoring device according to claim 1,
wherein the management unit produces second anomaly sign information representing a moving average line of the anomaly sign level.

3. The monitoring device according to claim 2, wherein the management unit produces the second anomaly sign information in which the moving average line of the anomaly sign level is superimposed on a graph showing the anomaly sign level over a lapse of time.

4. The monitoring device according to claim 1, wherein the plurality of sensors are configured to detect a flow rate and/or a temperature as the state of the control subject.

5. A monitoring method for monitoring a control subject according to output signals of a plurality of sensors each configured to detect a state of the control subject, the plurality of sensors including a combination of a subject sensor and its related sensor, the monitoring method comprising:

calculating a relationship fluctuation level representing the relationship between a fluctuation of the subject sensor and a fluctuation of the related sensor for each combination of the subject sensor and its related sensor;

calculating an anomaly sign level by summing up the relationship fluctuation level for all combinations of the subject sensor and its related sensor; and identifying the combination of the subject sensor and the related sensor with the relationship fluctuation level higher than a threshold indicating a collapse of the relationship and thereby calculating a number of appearances of the subject sensor and the related sensor included in the identified combinations, thus producing first anomaly sign information representing the number of appearances for each sensor.

6. A non-transitory computer-readable storage medium having stored therein a program causing a computer of a monitoring device configured to monitor a control subject according to output signals of a plurality of sensors each configured to detect a state of the control subject to implement the monitoring method according to claim 5.

* * * * *